United States Patent
Wolf et al.

(10) Patent No.: US 7,773,952 B2
(45) Date of Patent: Aug. 10, 2010

(54) SYSTEM FOR PROVIDING DATA IN A MOBILE DEVICE

(75) Inventors: Stefan Wolf, Schweiberdingen (DE); Dirk Lappe, Karlsruhe (DE); Guido Hovestadt, Wickede (DE)

(73) Assignee: Harman Becker Automotive Systems GmbH, Karlsruhe (DE)

( * ) Notice: Subject to any disclaimer, the term of this patent is extended or adjusted under 35 U.S.C. 154(b) by 410 days.

(21) Appl. No.: 10/897,595

(22) Filed: Jul. 23, 2004

(65) Prior Publication Data

US 2005/0075783 A1 Apr. 7, 2005

(30) Foreign Application Priority Data

Jul. 24, 2003 (EP) ................... 03016922

(51) Int. Cl.
*H04B 1/00* (2006.01)
(52) U.S. Cl. .................. 455/72; 455/556.1; 360/55; 701/117; 701/200; 701/55; 342/357.08; 358/1.13; 348/207.1
(58) Field of Classification Search .............. 455/556.1, 455/72; 360/55; 701/117, 200, 55; 342/357.08; 358/1.13; 348/207.1
See application file for complete search history.

(56) References Cited

U.S. PATENT DOCUMENTS

| | | | | | |
|---|---|---|---|---|---|
| 4,330,830 | A | * | 5/1982 | Perry | 701/117 |
| 5,388,045 | A | * | 2/1995 | Kamiya et al. | 701/35 |
| 5,699,255 | A | * | 12/1997 | Ellis et al. | 701/212 |
| 6,209,026 | B1 | | 3/2001 | Ran et al. | 709/218 |
| 6,377,825 | B1 | * | 4/2002 | Kennedy et al. | 455/569.2 |
| 6,427,115 | B1 | * | 7/2002 | Sekiyama | 701/208 |
| 6,462,674 | B2 | * | 10/2002 | Ohmura et al. | 340/901 |
| 6,487,493 | B2 | * | 11/2002 | Uekawa et al. | 701/200 |
| 6,542,471 | B1 | | 4/2003 | Ito | 370/252 |
| 6,574,048 | B2 | * | 6/2003 | Nill | 359/632 |
| 6,604,416 | B2 | * | 8/2003 | Tsujita | 73/146.5 |
| 6,813,661 | B2 | * | 11/2004 | Li | 710/62 |
| 6,937,732 | B2 | * | 8/2005 | Ohmura et al. | 381/86 |
| 6,941,224 | B2 | * | 9/2005 | Fukuyasu | 701/213 |
| 7,131,136 | B2 | * | 10/2006 | Monroe | 725/105 |
| 7,190,882 | B2 | * | 3/2007 | Gammenthaler | 386/107 |
| 7,197,228 | B1 | * | 3/2007 | Monroe et al. | 386/46 |
| 7,365,871 | B2 | * | 4/2008 | Monroe | 358/1.15 |
| 2001/0002455 | A1 | * | 5/2001 | Uekawa et al. | 701/200 |
| 2002/0118462 | A1 | * | 8/2002 | Nill | 359/632 |

(Continued)

OTHER PUBLICATIONS

European Patent Office Search Report regarding U.S. Appl. No. EP 03 01 6922, dated Nov. 25, 2003, 2 pages.

*Primary Examiner*—Matthew D Anderson
*Assistant Examiner*—April G Gonzales

(57) ABSTRACT

A system is presented for utilizing data in a mobile device in real-time and without the need for additional hardware. The system allows real-time processing of highly-compressed data that would otherwise require processing power in excess of that available from the system, or would otherwise not be possible without additional hardware. The system generally includes a processing device that receives the data in a highly compressed format, and includes a preprocessor that preprocesses the data to at least partially decode the data into a second compressed format. The processing device also includes a decompressor that fully decompresses the preprocessed data as needed by the system. The processing device may also include one or more memories for storing the preprocessed data until it is needed by the system.

24 Claims, 2 Drawing Sheets

U.S. PATENT DOCUMENTS

| | | | |
|---|---|---|---|
| 2002/0164973 A1* | 11/2002 | Janik et al. | 455/403 |
| 2003/0016463 A1* | 1/2003 | Nakahara et al. | 360/55 |
| 2003/0032447 A1* | 2/2003 | Bulthuis | 455/556 |
| 2003/0032448 A1* | 2/2003 | Bulthuis et al. | 455/556 |
| 2003/0098875 A1 | 5/2003 | Kurokawa et al. | 345/698 |
| 2004/0001214 A1* | 1/2004 | Monroe | 358/1.13 |
| 2004/0203772 A1* | 10/2004 | Galetti | 455/435.1 |
| 2004/0230345 A1* | 11/2004 | Tzamaloukas | 701/1 |
| 2005/0075783 A1* | 4/2005 | Wolf et al. | 701/117 |
| 2005/0238220 A1* | 10/2005 | Guerra Llamas et al. | 382/141 |
| 2007/0067079 A1* | 3/2007 | Kosugi | 701/35 |

* cited by examiner

SYSTEM FOR PROVIDING DATA IN A MOBILE DEVICE

PRIORITY CLAIM

This application claims priority based on European Patent Application No. 03016922.1, filed Jul. 24, 2003. The disclosure of the above application is incorporated herein by reference.

BACKGROUND OF THE INVENTION

1. Technical Field

The invention relates to a system, including a device, method and system alone or in combination, for providing data in a mobile device, which may be located in a vehicle or elsewhere.

2. Related Art

A demand has arisen for information and entertainment systems in which the driver of a vehicle is provided with traffic and navigation information and the passengers are provided with entertainment programs, such as audio or video broadcasts. These information and entertainment systems may be implemented in mobile devices, such as navigation systems, mobile radio receivers for receiving broadcasted audio signals, and television receivers for receiving broadcasted video and audio signals. However, the computing and memory limitations of these mobile devices, particularly those installed in vehicles, often make simultaneous provision of information and entertainment data impossible.

A navigation system generally includes a storage device in which program data, navigation data and voice data are made available. For example, in standard navigation systems, voice samples, which are used to output navigation instructions, may be provided on a removable storage device such as a compact disk (CD), or stored in a fixed storage device, such as the internal memory of the navigation system device. Navigation systems also generally include one or more processing devices that, while the vehicle is traveling, access the data in the storage device and process the data in real-time.

In order to store data, particularly voice data, in the storage device, data compression is usually required. The data compression may include a lower or higher degree of compression. Each degree of compression has associated problems. A higher degree of compression reduces the storage area needed to store the compressed data in the storage device, but generally requires a more complex method for encoding and decoding the data, and may require additional computing hardware. One example of a compression code with a higher degree of compression (a "high compression code") is as MPEG audio layer 3 (MP3). When data is encoded with a high compression code, such as MP3, it may need to be decoded with a specialized piece of digital signal processing hardware. High compression codes, such as MP3 and those that comply with the ITU standard G.723, can achieve a significantly high degree of compression (for example, a compression factor of up to 10), which results in a data rate of approximately 10-32 kbit/s with the same reproduction quality. However, decoding the stored data requires a significant amount of calculation power and can only be accomplished using software in systems that have this calculation power. Hence, when high compression codes are used in a navigation system, additional hardware needs to be installed in the navigation system, or existing components need to be used by a plurality of applications in a time sharing arrangement. In many navigation systems, the navigation language cannot be mixed with MP3 data, such as music, because more than one decoding process needs to be established simultaneous.

In comparison, a lower degree of compression may allow for real-time processing of the data without using complex decoding hardware and/or software. However, using a lower degree of compression requires more storage space on the storage device to store the compressed data. One example of a compression code with a lower degree of compression (a "low compression code") is adaptive delta pulse code modulation (ADPCM). When data is encoded with a low compression code, such as ADPCM, it may then be decoded using software, hardware, or a combination of hardware and software. Although the use of low compression codes, such as ADPCM, allows decoding in real-time by a processor such as the central processing unit (CPU) of a navigation system, the compression rates that can be achieved are comparatively low, currently about 64 kbit/s. Details of ADPCM, available from ITU-T recommendations G.726 and G.727, envision data rates of 16, 24, 32 and 40 kbit/s. According to the new ITU standard G.722 for broadband speech transmission based on a frequency range of 50 Hz to 7 kHz, which would result in normal PCM-technique to a data rate of 128 kbit/s, a compression to 64 kbit/s can be obtained.

SUMMARY

A system, including a device, method, system, alone or in combination, for providing data in a mobile device, in real-time and without additional hardware is presented. The system allows real-time processing of data in a format so highly compressed that the calculation power required to process the data in real-time exceeds the calculation power of the system, or processing the data would not otherwise be possible without additional hardware capacity. In addition the system may work with data formatted using a variety of compression formats without the need for a real-time decoder for each compression format.

The system generally includes a processing device that receives the data in a highly compressed format. The processing device includes a preprocessor that pre-processes the data to decode it into a second compressed format. The processing device also includes a decoder that fully decompresses the data as needed by the system. The processing device may also include one or more memories for storing the data in the second format until it is needed by the system. As a result, the data may be processed and communicated in real-time using only the hardware included in the mobile device.

Other systems, methods, features and advantages of the invention will be, or will become, apparent to one with skill in the art upon examination of the following Figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the Figures are not necessarily to scale, emphasis instead being placed upon illustrating the principles of the invention.

DETAILED DESCRIPTION OF THE PREFERRED EMBODIMENTS

The following description will focus on a system for providing data in a mobile device, which is embodied in a navigation system in a vehicle. However, any other mobile device, such as a mobile telephone, radio receiver, or television receiver, is equally suitable for the system. The vehicle may be any device or structure for transporting persons or things including automobiles, trucks, farming equipment, mining equipment, golf carts, mobile robots, ships, planes, and spacecraft.

Figure 1:
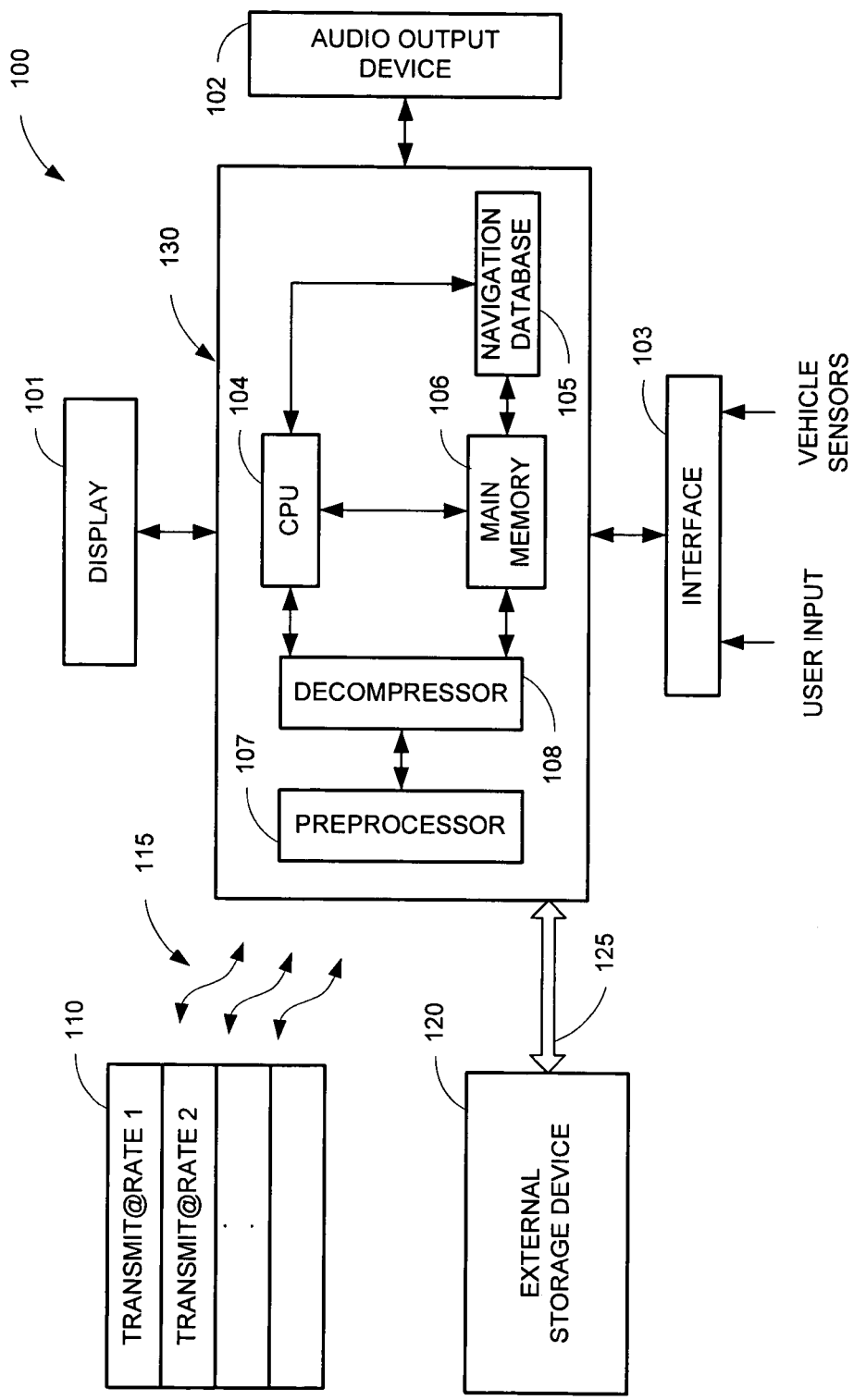
FIG. 1 is a block diagram of a navigation system embodying a system for providing data in a mobile device.

As shown in FIG. 1, a navigation system 100 generally includes a navigation device 130, which may be in communication with a display 101, audio output device 102, and interface 103. The display 101 may include a liquid crystal display (LCD), thin film transistor (TFT or active matrix) display, or other such display unit and may be installed in a vehicle in a position suitable for the driver of a vehicle. The display 101 may be any type of visual, manual, audio, electronic or electromagnetic device capable of communicating information from a processor or memory to a person or other processor or memory. Examples of displays 101 include monitors, liquid crystal displays, and interfaces.

The navigation system 100 may also include an audio output device 102. The audio output device 102 may include a sound system with one or more loudspeakers or speakers. The interface 103 generally allows a user, such as a driver or passenger, to input preferred parameters or instructions, such as start and destination locations, data display quality, and audio output level.

The interface 103 may be any type of visual, manual, audio, electronic or electromagnetic device capable of communicating information from a person to a processor or memory. Examples of interfaces 103 include liquid crystal displays, keyboards, microphones, voice recognition systems, trackballs, mice, networks, buses, and interfaces. Alternatively, the interface 103 and display 101 may be included in a single device such as a touch screen, computer, processor or memory in communication with the navigation device 130. The interface 103, may also receive information via vehicle sensor signals, such as those indicating the speed or direction of the vehicle. The components of the navigation system 100 may communicate with each other and external devices and systems using any type of electromagnetic communications via any electromagnetic channel or network.

The navigation device 130 generally includes one or more central processing units (each a CPU) 104. The CPU may be any type of device or devices used to process digital information. The CPU may be in communication with a navigation database 105 and a main memory 106 for reading and writing navigation data during operation of the navigation device 130 and as the vehicle moves along a route. The main memory 106 may also store program data, general data, and acoustic data, such as voice, for communicating navigation instructions to the user. The main memory 106 and the navigation database 105 may include any type of fixed or removable digital storage device and, if needed, a device for reading the digital storage device including, floppy disks and floppy drives, CD-ROM disks and drives, optical disks and drives, hard-drives, RAM, ROM, E-PROMS, flash memories and other such devices for storing digital information.

In addition, in order to update or supplement the navigation database 105, which may have a limited storage capacity, the navigation device 130 may access an external data source, such as a server 110 or an external storage device 120. The server 110 may be in communication with the navigation device 130 via wireless communications over an air channel. For example, the wireless communication may follow an existing mobile communication standard, such as GSM or UMTS. Alternatively, for example when performing a download in the course of a regular maintenance service, the server 110 may be in communication with the navigation device via some other type of wireless or wired electromagnetic communication over an air or wired channel, respectively. The external storage device 120 may include any type of fixed or removable digital storage device and, if needed, a device for reading the digital storage device including, floppy disks and floppy drives, CD-ROM disks and drives, CD and DVD disks and drives, optical disks and drives, hard-drives, RAM, ROM, E-PROMS, flash memories and other such devices for storing digital information. The external storage device 120 may be internal or external to the vehicle and in communication with the navigation device 130 via any form of electromagnetic communication, for example, a wired or optical data bus 125.

From time to time, the navigation device 130 may need to access additional data for navigation and/or other purposes, which is not stored in the navigation database 105 or main memory 106. The data may include any type of data, such as navigation instructions in various languages, audio data, and/or image data, such as still pictures, moving pictures, or map data.

The data stored on the server 110 and/or the external storage device 120 may be in a highly compressed format with a compression factor in a range of a bout 5 to 10, having been compressed using a high-compression code such as, MP3 or others. The navigation device 130 may include a preprocessor 107 for receiving and converting the data stored on the server 110 and/or external storage device 120. The data may be converted from the highly compressed format to a second format having a lesser degree of compression. However, the second format does not necessarily require a lesser degree of compression. The second format may have a higher degree of compression than the first format, provided that the second format is more suitable for real-time processing by the mobile device. Once converted into the second format, the data may be stored in the main memory 106 or navigation database 105 for future use. The navigation device 130 may further include a decompressor 108 that fully decompresses the data stored in the second format as the data is needed by the navigation system 100.

In general, the typical computing and storage capabilities of the navigation device 130 are sufficient for performing the pre-processing and decompressing operations. Because the decompression is may be carried out only when the data is actually required by the navigation device to provide output signals in visual or audible form, the ordinary computing and storage constraints are generally not exceeded.

Figure 2:
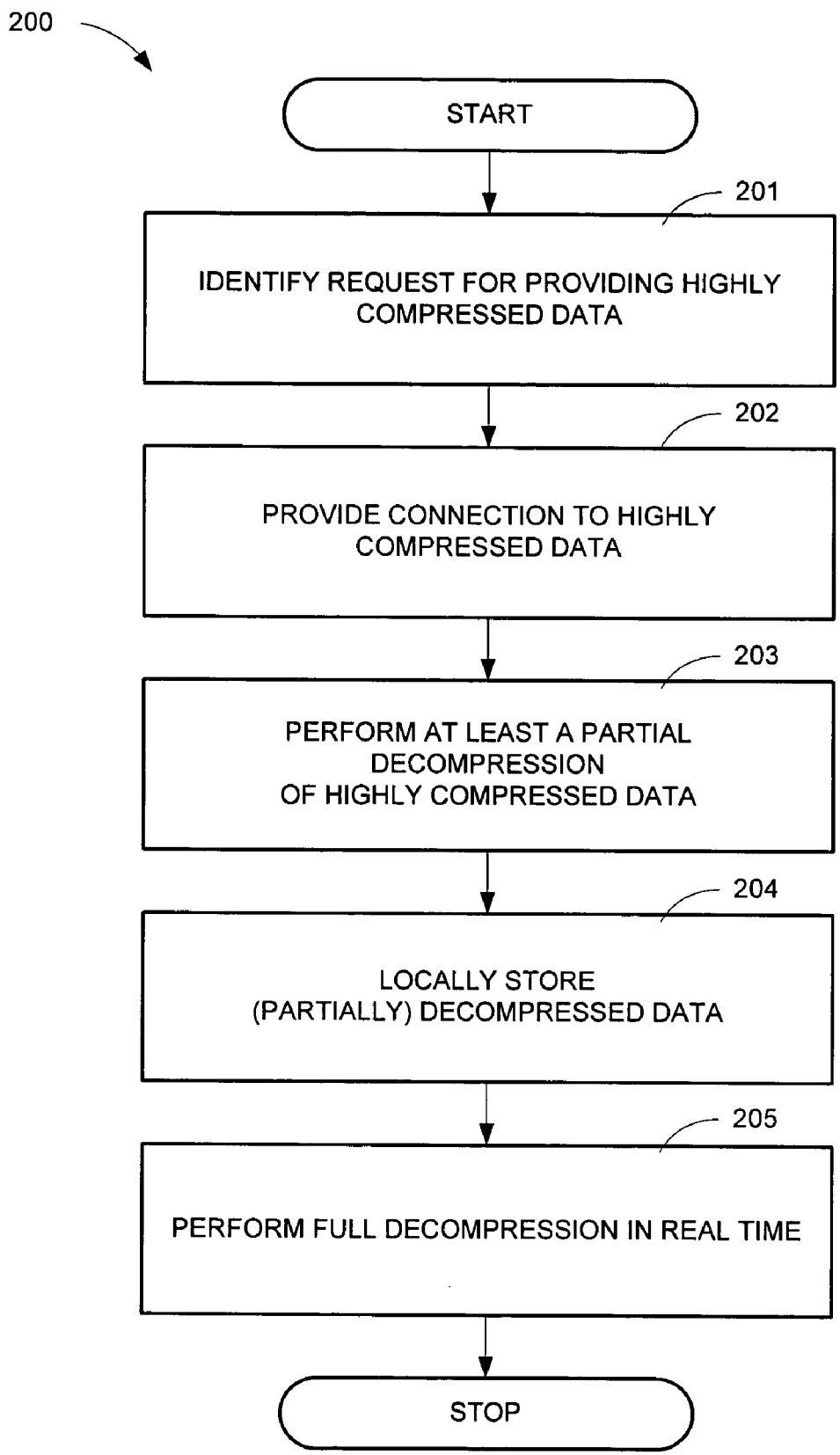
FIG. 2 is a flow chart of a method for providing data in a mobile device.

An example of a method for providing data in a navigation device is shown in FIG. 2. The method of FIG. 2 may be implemented by a mobile device, such a s the navigation device 130 of FIG. 1, and therefore will be discussed with reference to the components of FIG. 1. Although described in terms of a navigation system, this example of the method is equally applicable to any other mobile device, such as a mobile telephone, a radio receiver, or television receiver. The method 200 includes identifying a request for providing highly compressed data 201. This request may come from the navigation device 130, and may be based on a need of the navigation device 130 for data that is not present in the navigation database 105 or local memory 106 in decompressed form. Alternatively, the request may come from the server 110 or the external storage device 120. Such a request may occur under situations in which the server 110 attempts to transmit data to the navigation device 130, such as during a mandatory data update.

The requested data may include additional or corrected data or data that has not been stored in the navigation device 130 due to storage capacity limitations. For example, navigation data relating to a specific region to which the vehicle has not yet traveled might create a need for transmitting additional data from a server 110 or external storage device 120. In another example, the need for a different navigation language might create a need for transmitting additional data. In yet another example, the need for off-board navigation instructions or navigation instructions for hybrid on-board/off-board navigation may create a need for transmitting data from a central server.

Referring to FIG. 2, to communicate the highly compressed data, a connection to the highly compressed data is provided 202 between the navigation device 130 and the server 115 or the external storage device 120. The connection may include a wireless, online connection according to a currently available telecommunication standard, or a wired connection using available transmission protocols. Subsequently, the highly-compressed data is transmitted from the server 115 or the external storage device 120 over the established connection to the preprocessor 107 in the navigation device 130. The preprocessor 107 then pre-processes the highly compressed data by applying a suitable decompression algorithm to decompress the highly compressed data at least partially 203. The degree with which the partial decompression is carried out by the preprocessor 107 in step 203 may be made dependent on the actual free storage capacity available in the navigation database 105 or the main memory 106. As a result of the decompression, the data is decompressed from the highly compressed format into the same or a different format having a different, but generally lesser (including no) degree of compression. In the partially decompressed format, the data may be locally stored in step 204, for example, in the navigation database 105 or main memory 106. This partial decompression may be accomplished using the computing capacity of the one or more CPUs 104 in the navigation device 130 without the use of additional special decoding and decompression hardware, such as a decoder or a digital signal processing chip. In addition, because the data can be pre-processed without real-time requirements, the computing capacity can be balanced more easily during inactive periods in which the CPU is not occupied with other tasks.

After storing the partially decompressed data, full decompression of the data may be performed on demand in real-time 205. To accomplish full decompression, the navigation system 100 accesses the locally stored, pre-processed data, decompresses the data and communicates the data in the form of visible or audible signals in real-time. In the context of a navigation system, real-time includes providing data in the form of navigation instructions in the desired quality to the driver as the vehicle moves along the route. The speed with which the navigation instructions are communicated to the driver may depend on the vehicle speed. The decompressed data may be further processed or stored for other purposes. For example, after manipulation, the data may be transmitted back to the server 110 or the external storage device 120.

The conversion from a partially decompressed format to a fully compressed format may also be accomplished with the existing computing capacity of the mobile device. Therefore, there is no need to provide additional computing or decoding hardware or to occupy other existing special decoding hardware that may be serving other functions, such as audio or video decompression. However, in other implementations, additional computing and/or decoding hardware may be used. Moreover, transmitting highly compressed data to the navigation device 130 may reduce connection time and the associated costs.

The server 110 may provide data for transmission at a plurality of different data rates, which allows the user or the navigation device 130 to select a suitable data rate. The choice of data rate may be made in view of the calculation power of the navigation system 100 and/or other operational parameters, such as the vehicle speed, demands of the user, or quality with which the data is to be communicated by the display 101 or audio output device 102. The navigation system 100 may allow a user to save time and costs by selecting lower quality data that may be transmitted at a faster transmission rate. This feature may be useful particularly in a mobile environment for data evaluation. This feature may also allow a high quality version of the data to be downloaded at a later time, or when the vehicle has reached access to a non-mobile data source, such as a mass storage device (for example, a memory-card) either directly or via a local network (for example, a local area network (LAN) or wide local area network (WLAN)). This feature may provide quick access to data in a mobile environment, thus saving time and costs, without an ultimate loss of quality.

By providing two-stage decompression, the hardware computing and memory storage requirements do not undergo additional capacity constraints. As a result, decoder hardware used for direct real-time decompression of highly compressed data, for example, an audio decoder chip (for example MP3) may not be impaired by the processing of real-time navigation signals.

As previously mentioned, the method of the present invention is not only applicable to a navigation system, such as that described above, but may also be applicable to a mobile device requiring video data. For example, if the server 110 (see FIG. 1) has video data compressed in the MPEG4 compression format, this video data may be transmitted to a mobile device in the MPEG4 format. The mobile device may then pre-process the MPEG4 video data to obtain video data in MPEG2 format. The mobile device may then decode the MPEG2 video data in real-time when desired by the user. To this end, the mobile device may include a real-time MPEG2 decoder. Although initial decoding into MPEG2 format adds further computing time, the decoding into MPEG2 format may be performed offline, which means that the decoding into MPEG2 format may be performed without establishing an online connection to the server. In addition, if lower quality data in a fast transmission format is used, the online connection time can be reduced, resulting in a corresponding cost savings.

In a further example of a system for providing data in a mobile device, the navigation device 130 (see FIG. 1) includes a hardware decoder for MP3 data, and the server 110 provides audio data in a format having a higher degree of compression than MP3. Upon reception of the highly compressed data, the navigation device transcodes the received data with a correspondingly adapted data rate into the MP3 format. Thereafter, data with high quality is available in MP3 format. One advantage of the system in this example is that a smaller amount of data was transmitted using the highly compressed format than would be transmitted if the data were in MP3 format. In addition, the data conversion may be processed in a manner that does not introduce any waiting time for data availability that is detectable by the user. For example, the processing may be done in the background, or during periods in which the device is switched off.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for providing data in a mobile device comprising the steps of:

receiving data from an external data source in a first format having a first degree of compression and communicating the compressed data to a mobile device with a data rate selected in accordance with a vehicle speed independent of tire rotation;

processing the data in the first format into a second format having a different degree of compression than the first format before the data is used by the device; and decompressing the data in the second format when the data is needed by the mobile device.

2. The method of claim 1, further comprising storing the data in the second format.

3. The method of claim 1, where the mobile device includes a navigation device.

4. The method of claim 3, where the different degree of compression of the second format depends on at least one of a group comprising vehicle speed, data quality, computing capacity of the navigation device, or storage capacity of the navigation device.

5. The method in claim 3, where the data in the second format is decompressed with a processing speed sufficient for the navigation device to communicate navigation instructions in real-time.

6. The method of claim 5, where the data in the second format is decompressed with a processing speed sufficient for the navigation device to communicate navigation instruction in real-time according to a movement of the mobile device.

7. The method of claim 3, where providing data in a first format includes facilitating communication between the navigation device and a server via an online radio communication channel.

8. The method of claim 1, where providing data in the first format includes receiving the data in the first format from an external storage device, and processing the data into the second format includes processing the data into a format with a degree of compression lower than that of the first format.

9. A system for providing data, comprising:

an external data source configured to store and transmit to a mobile device data in a first format having a first degree of compression with a data rate selected in accordance with a vehicle speed independent of tire rotation; and a mobile device in communication with the external data source, comprising:

a preprocessor configured to process the data in the first format into a second format having a different degree of compression than the first format;

a storage device configured to store the data in the second format; and a decompressor configured to decompress the data in the second format to produce decompressed data when the decompressed data is needed by the mobile device.

10. The system of claim 9, where the mobile device is implemented in a head unit mounted in the vehicle.

11. The system of claim 9, where the mobile device includes a navigation device that provides instructions along a route.

12. The system of claim 11, where the mobile device includes a navigation database for storing the data in the second format.

13. The system of claim 11, further comprising an audio output device for communicating the decompressed data in real-time as audible navigation instructions.

14. The system of claim 11, further comprising an audio output device for communicating the decompressed data according to a vehicle movement in real-time as audible navigation instructions.

15. The system of claim 11, further comprising a display device for communicating the decompressed data in real-time as visual navigation instructions.

16. The system of claim 11, further comprising a display device for communicating the decompressed data in real-time according to the vehicle's movement as visual navigation instructions.

17. A method for providing data in a mobile device comprising the steps of:

requesting navigation data from an external data source when the navigation information is not present in, a database in a mobile device, the request generated by a processor of the mobile device;

transmitting the navigation data from the external data source, in a first format having a first degree of compression, to a mobile device with a data rate selected in accordance with a vehicle speed independent of tire rotation;

processing the navigation data in the first format into a second format having a different degree of compression than the first format; and decompressing the navigation data from the second format when the data is needed by the mobile device, where the navigation data is processed into the second format during one or more background processing periods.

18. The method of claim 17, further comprising storing the data in the second format.

19. The method of claim 17, where the mobile device includes a navigation device.

20. The method of claim 19, where the different degree of compression of the second format depends on at least one of a group comprising vehicle speed, data quality, computing capacity of the navigation device, or storage capacity of the navigation device.

21. The method in claim 19, where the data in the second format is decompressed with a processing speed sufficient for the navigation device to communicate navigation instructions in real-time.

22. The method of claim 21, where the data in the second format is decompressed with a processing speed sufficient for the navigation device to communicate navigation instruction in real-time according to a movement of the mobile device.

23. The method of claim 19, where providing data in a first format includes facilitating communication between the navigation device and a server via an online radio communication channel.

24. The method of claim 17, where providing data in the first format includes receiving the data in the first format from an external storage device, and processing the data into the second format includes processing the data into a format with a degree of compression lower than that of the first format.

* * * * *